(12) United States Patent
Adiga et al.

(10) Patent No.: US 12,548,167 B2
(45) Date of Patent: Feb. 10, 2026

(54) AUTOMATED REGION SELECTION FOR AUTO SWEEP

(71) Applicant: FEI Company, Hillsboro, OR (US)

(72) Inventors: Umesh Adiga, Portland, OR (US);
Derek Higgins, Scappoose, OR (US);
Mark Biedrzycki, Beaverton, OR (US);
Melanie Doud, Hillsboro, OR (US)

(73) Assignee: FEI Company, Hillsboro, OR (US)

( * ) Notice: Subject to any disclaimer, the term of this patent is extended or adjusted under 35 U.S.C. 154(b) by 108 days.

(21) Appl. No.: 18/470,348

(22) Filed: Sep. 19, 2023

(65) Prior Publication Data

US 2025/0095159 A1 Mar. 20, 2025

(51) Int. Cl.
| | |
|---|---|
| *G06T 7/136* | (2017.01) |
| *G06T 7/11* | (2017.01) |
| *H01J 37/153* | (2006.01) |
| *H01J 37/21* | (2006.01) |
| *H01J 37/22* | (2006.01) |
| *H01J 37/26* | (2006.01) |

(52) U.S. Cl.
CPC ............ *G06T 7/136* (2017.01); *G06T 7/11* (2017.01); *H01J 37/153* (2013.01); *H01J 37/21* (2013.01); *H01J 37/222* (2013.01); *H01J 37/265* (2013.01); *G06T 2207/10061* (2013.01); *G06T 2207/20016* (2013.01); *H01J 2237/1532* (2013.01); *H01J 2237/216* (2013.01); *H01J 2237/221* (2013.01)

(58) Field of Classification Search
CPC . G06T 7/136; G06T 7/11; G06T 2207/10061; G06T 2207/20016; H01J 37/153; H01J 37/21; H01J 37/222; H01J 37/265; H01J 2237/1532; H01J 2237/216; H01J 2237/221
See application file for complete search history.

(56) References Cited

U.S. PATENT DOCUMENTS

| | | | |
|---|---|---|---|
| 6,173,083 B1 | 1/2001 | Avinash | |
| 6,476,398 B1 | 11/2002 | Xu et al. | |
| 2010/0149210 A1* | 6/2010 | Matsunaga | G06T 7/174 382/106 |
| 2013/0089249 A1* | 4/2013 | Mueller | G06V 20/695 382/128 |
| 2016/0078279 A1* | 3/2016 | Pitre | G16H 20/70 382/118 |
| 2017/0309021 A1* | 10/2017 | Barnes | G06T 7/0012 |

(Continued)

OTHER PUBLICATIONS

Extended European Search Report for related Application No. EP 24198117.4, mailed Jan. 30, 2025, 10 pages.

(Continued)

*Primary Examiner* — Sunghyoun Park
(74) *Attorney, Agent, or Firm* — Klarquist Sparkman, LLP

(57) ABSTRACT

Sample regions of interest (ROIs) for use in autofocus procedures are identified based on a gradient image of the sample. ROIs with gradient values greater that a threshold are selected, and eigenvalues of the associated image matrices are determined. ROIs with suitable variation in eigenvalues such as at least two relatively large eigenvalues are associated with high contrast features orientated in multiple directions so that such ROIs are suitable for automatic focus and astigmatism correction. Suitable ROIs can also be identified based on a histogram of gradient orientations.

24 Claims, 13 Drawing Sheets

(56) References Cited

U.S. PATENT DOCUMENTS

2020/0320775 A1* 10/2020 Holladay .................. G06T 7/11
2022/0245922 A1* 8/2022 Barroso Laguna .... G06V 10/82

OTHER PUBLICATIONS

Hermann, et al., "ANIMATED-TEM: a toolbox for electron microscope automation based on image analysis," Machine Vision and Applications, 23(4):691-711 (Jul. 26, 2011).

* cited by examiner

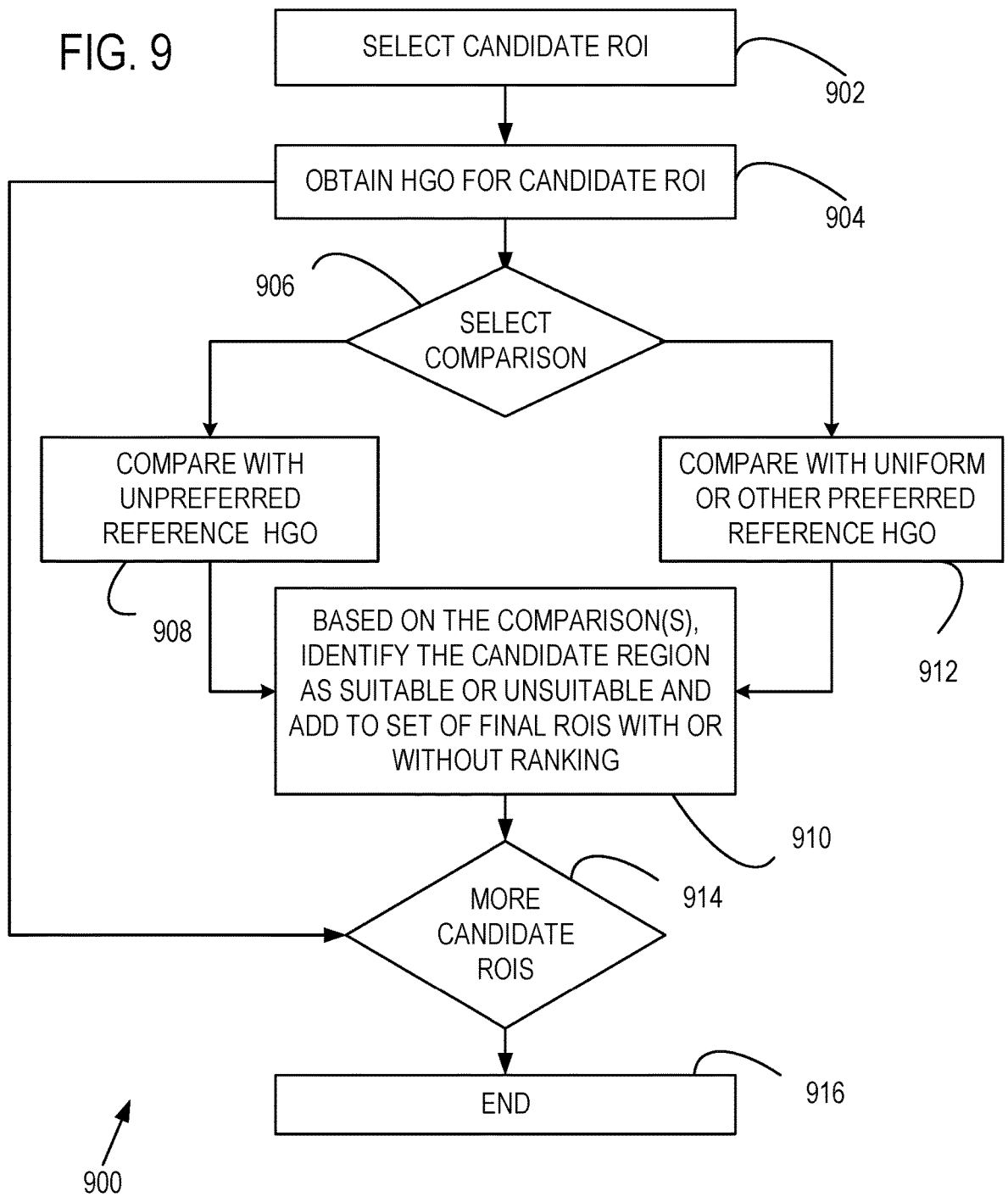

AUTOMATED REGION SELECTION FOR AUTO SWEEP

FIELD

The disclosure pertains to automatic focus and astigmatism control in charged-particle-beam imaging.

BACKGROUND

In charged-particle beam (CPB) imaging systems, automated procedures are available for adjustment of optical column focus and astigmatism. With these methods, it is important to sweep the CPB over a suitable region of interest (ROI). In conventional approaches, an entire image field of view (FOV) is used, which can make execution of automatic focus and astigmatism correction slow, which is especially problematic when repeated execution of these automatic functions is necessary. In other approaches, a ROI that is suitable for use with automatic functions is selected by an operator. With this manual approach, consistency among users is difficult to achieve. In addition, manual selection of the ROI is preferably done by users with training and experience in imaging physics. If a sample rotates and/or moves or a stage drifts, it is likely that a suitable ROI is no longer being swept for use by the automatic procedures, and additional manual adjustments are needed. For at least these reasons, improved approaches are needed for selection of ROIs for use in automated focus and astigmatism control.

SUMMARY

Methods and apparatus are disclosed that permit selection of suitable regions of interest (ROI) for use in autofocus and astigmatism correction. A gradient-based image is produced from a sample image to identify candidate ROIs. Candidate ROIs are evaluated based on eigenvalues of the associate ROI image matrices. In some examples, a sample image is obtained and processed to obtain gradient magnitudes. A set of initial candidate ROIs is selected based on gradient magnitudes greater than a threshold value. In further examples, the sample image is processed to produce images associated with at least three image resolutions corresponding to an image pyramid and the candidate ROIs are ranked based on eigenvalues associated with corresponding image blocks in at least one of the three images of the image pyramid. Alternatively, histograms of gradients can be used to evaluate candidate ROIs.

The foregoing and other features, and advantages of the disclosed technology will become more apparent from the following detailed description, which proceeds with reference to the accompanying figures.

BRIEF DESCRIPTION OF THE DRAWINGS

FIG. 9 illustrates a representative method of selecting and ranking candidate ROIs using preferred and/or unpreferred reference HGOs.

DETAILED DESCRIPTION

Figure 6C:
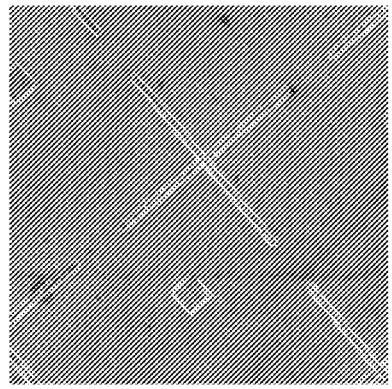
FIGS. 6A-6C are images of sample areas with features that are suitable for selection as ROIs for use in autofocus procedures.
Figure 6B:
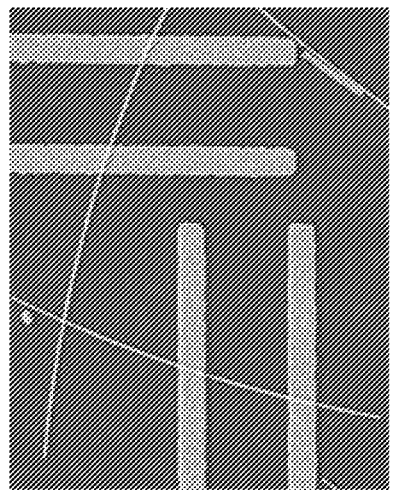
Figure 6A:
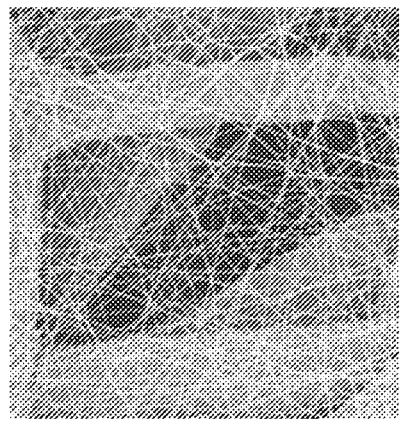
Figure 6E:
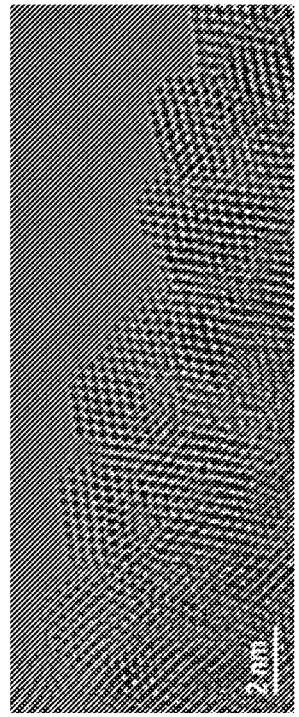
FIGS. 6D-6E are images of sample areas that are less suitable for use as ROIs in autofocus procedures.
Figure 6D:
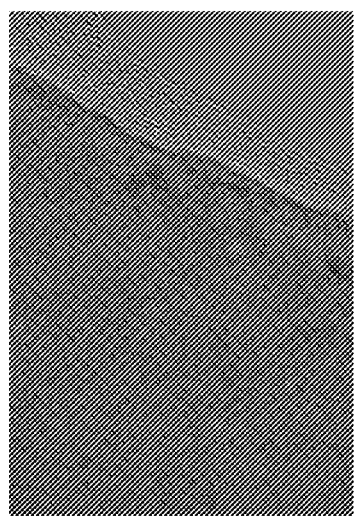

Regions of interest (ROIs) for use in focus adjustment preferably can be imaged to have strong edges and high contrast with their backgrounds. ROIs for use in astigmatism correction can be imaged to have lines, edges, or line-like structures in at least a few directions, such as orthogonal corners. Typically, the selection of ROIs that can be imaged to provide such high contrast features aligned in different directions avoids sample areas with granular texture that can have intensity variations in multiple directions but lack well-defined edges. Representative sample portions that are preferred for use in defining ROIs for autofocus procedures are shown in FIGS. 6A-6B. These images show features with strong edges and high contrast in multiple directions. FIG. 6C shows another satisfactory sample area, though with less contrast and with edges in fewer directions. FIGS. 6D-6E show typical unsatisfactory areas, with low contrast and/or granular structure. Disclosed below are approaches that permit automated selection of suitable ROIs, and thus permitting fully automated focus procedures.

General Terminology and Considerations

As used herein, "autofocus," "autofocusing," "autofocus procedures," and the like refer to processor-based adjustments of a charged particle beam (CPB) optical column to establish focus and/or to reduce astigmatism unless indicated otherwise. Optical column refers generally to CPB lenses, deflectors, stigmators, and other CPB optical elements used in imaging. A region of interest (ROI) refers to a selected portion of a sample or a corresponding portion of a sample image. A size of an ROI is referred to as a block size and refers to a size of a sample area or an associated image area or number of pixels. Images can be stored in various formats such as JPG, TIFF, BMP, or other formats but in the examples below, representations as two-dimensional arrays are used. Image can also refer to a displayed view of a specimen such as presented on a display device or other visual display. In the examples, images generally correspond to two-dimensional arrays of intensity values I arranged in rows and columns, i.e., an array of values I(n,m), wherein n, m are integers referring to row and column locations. For such arrays, image gradient values are proportional to I(n+1,m)−I(n,m) and I(n,m+1)−I(n,m) in row and column directions, respectively.

Thresholding an image or image portion refers to comparing image intensities in the image or image portion with a base level and typically ignoring intensities below the base level.

In the examples, an image of a specimen or a portion thereof is processed to define a series of lower resolution images, typically so that each image in the series has a resolution that is two times less that of the previous image in the series. This resolution reduction can be obtained by, for example, discarding pixels in every other row and column. This series of images can be pictorially represented as levels of a pyramid, with a base corresponding to the highest resolution image in the series with the apex level corresponding to the lowest resolution image in the series. While resolution differences by factors of 2 are convenient as it is straightforward to discard alternating rows and columns of pixels, other factors such as 3, 4, or any other integer values can be used. Instead of simply discarding pixels, adjacent pixels in an image can be averaged to and used to define a next image in a series. Images in a series need not use a common factor between levels, although it is convenient to use a common reduction by a factor of two. Images in Gaussian pyramids are formed by applying a Gaussian blur defined by a number of pixels corresponding to a standard deviation followed by discarding pixels as discussed above. Regions of interest (ROIs) images are referred to as having a block size based on a number of rows and columns which is equivalent to an ROI area on a sample.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and nonobvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest, "best," "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Example 1. ROIs Using a Gaussian Pyramid

Figure 1:
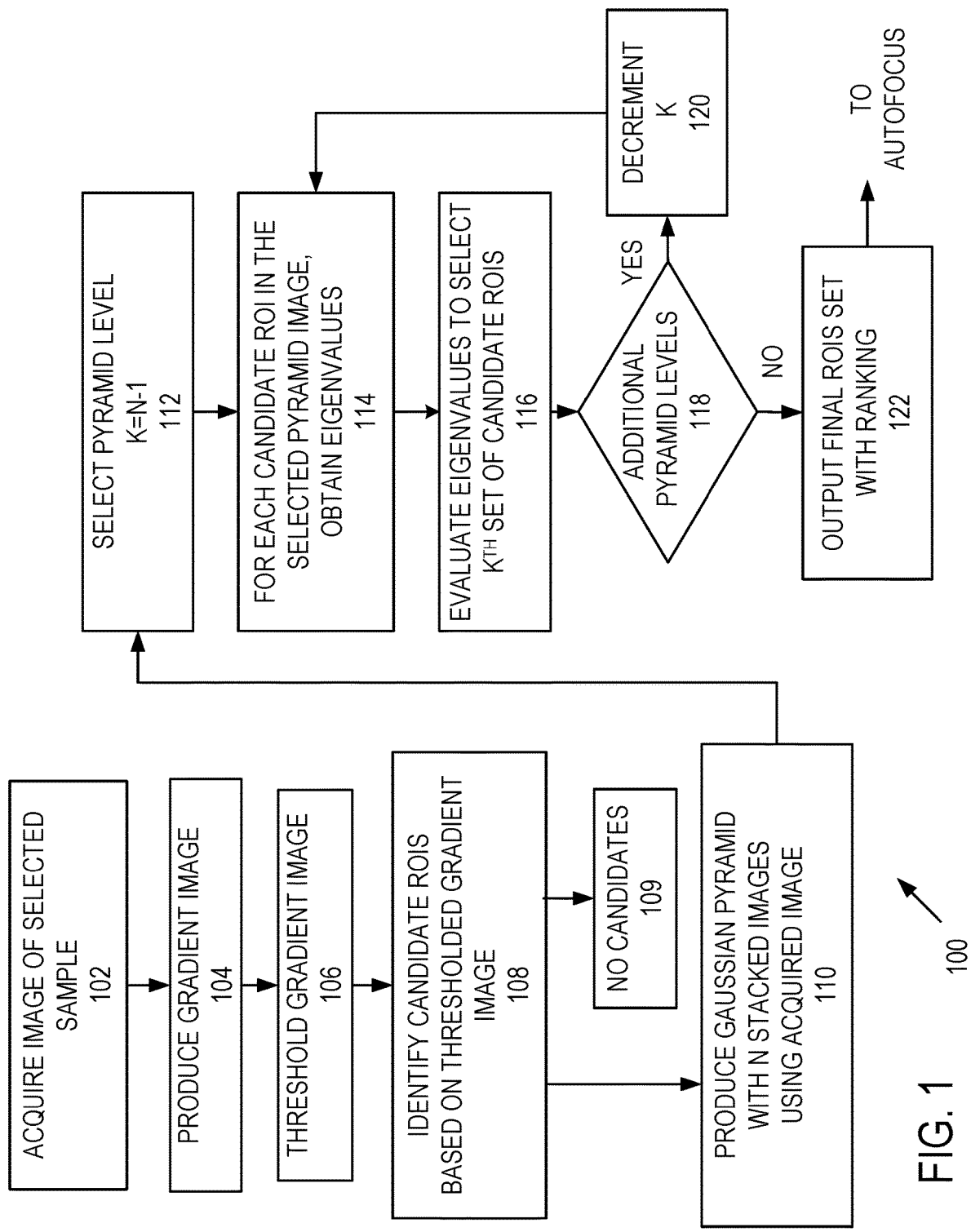
FIG. 1 illustrates a representative method of identifying suitable regions of interest (ROIs) for use in automatic focus and/or astigmatism adjustment.

With reference to FIG. 1, a representative method 100 of identifying suitable ROIs for use in autofocus of a CPB instrument includes acquiring an image of a sample with the instrument at 102 and processing the acquired image to produce a corresponding image based on gradients of the acquired image at 104. Typically, the gradient image is based on gradient magnitudes ($|\nabla I(x, y)|$, wherein I(x,y) is image intensity as a function of position (x, y), and generally represented as I(m,n) wherein m, n are non-negative integers denoting row and column locations. The gradient magnitude image can be thresholded at 106 to produce a thresholded gradient magnitude image. Thresholding can be done by, for example, normalizing gradient magnitudes in the gradient magnitude image using a largest gradient magnitude and then selecting a suitable threshold level such as a normalized gradient image magnitude that is greater than at least 0.1, 0.2, 0.3, 0.4, 0.5, 0.6, 0.7, 0.8, or 0.9. At 108, candidate ROIs are identified based on the thresholded gradient image and can include some or all ROIs in the thresholded gradient image. Candidate ROI block size can be selected as convenient. In some cases, a particular image may lack sufficient gradient magnitudes and no candidate ROIs are identified at 109. In other examples, gradient components in two directions are evaluated.

The candidate ROIs may or may not be suitable for autofocus procedures and can be further evaluated as follows. At 110, a pyramid such as a Gaussian pyramid is produced based on the acquired image with N stacked images which can be labelled as 0, 1, . . . , N−1, wherein N is an integer. The image associated with level 0 can be the original acquired image and each higher level in the pyramid is smaller by a factor of 2, i.e., for an acquired image of 4096 by 4096 pixels, the stacked image in a $K^{th}$ level of the pyramid will be a $4096/2^K$ by $4096/2^K$ pixel image, for K=0, . . . , N−1.

Figure 1A:
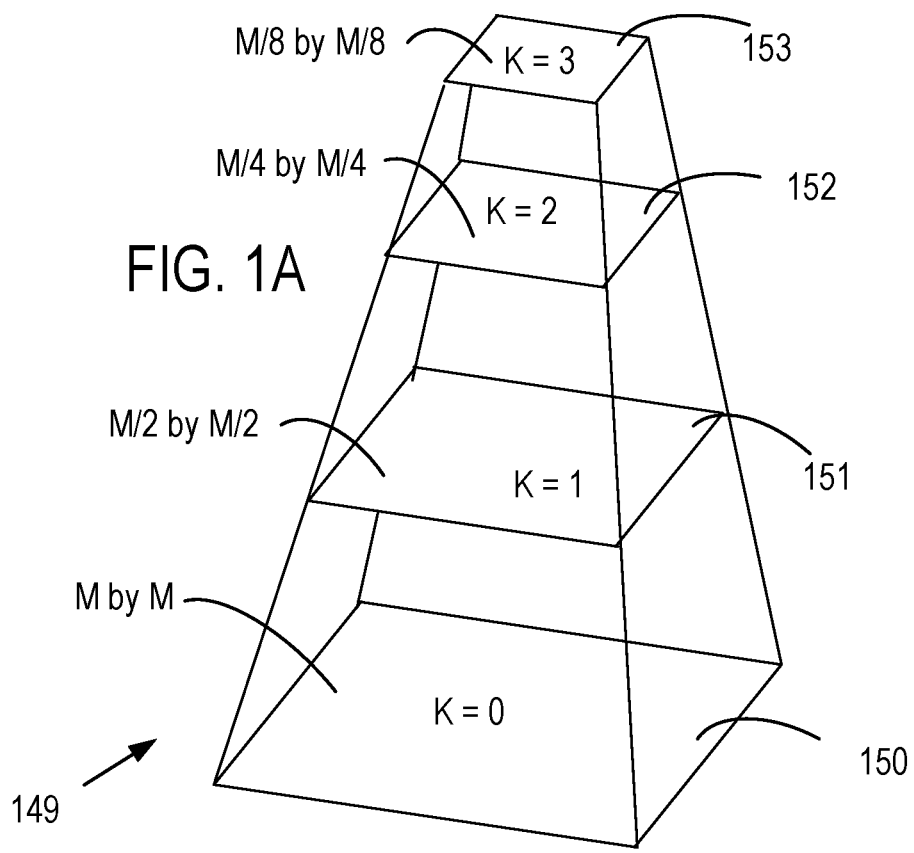
FIG. 1A illustrates a representative 4-level Gaussian pyramid.
Figure 1B:
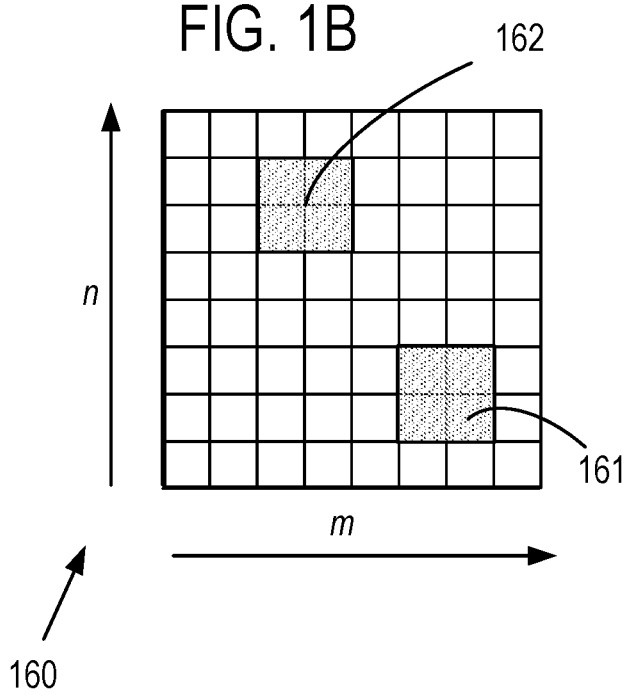
FIG. 1B illustrates ROIs in an image at any level of the Gaussian pyramid of FIG. 1A.

A representative pyramid 149 is illustrated in FIG. 1A for N=3, i.e., a four-level pyramid, with images 150-153. The image 150 is the acquired image; the images 151, 152, 153 are images corresponding to resizing by factors of 2, 4, and 8, respectively. FIG. 1B illustrates a representative image 160 associated any of the pyramid levels, illustrating ROIs 161, 162. This image 160 is shown as an 8 pixel by 8-pixel block size for convenient illustration; typically, larger block sizes are used. The images of each level of the pyramid can be obtained by applying a Gaussian blur and then discarding pixels to produce the appropriate resolution. The Gaussian blur generally is based on a standard deviation of between 2 and 10 pixels.

At 112, a pyramid level (i.e., a $K^{th}$ image) is selected, starting with the topmost image. Portions of the $K^{th}$ image corresponding to some or all of the candidate ROIs are selected. The selected portions can be represented by an M-by-M matrix, wherein M is an integer associated with a block size of the ROIs. For each of the selected candidate ROIs, eigenvalues of the associated M-by-M matrix from the $K^{th}$ level image are determined. At 116, the eigenvalues are used to select a $K^{th}$ set of candidate ROIs which can include some or all of the ROIs identified at 108 or from a previous evaluation of an image from a higher level in Gaussian pyramid. The above procedure is repeated with images from other levels of the Gaussian pyramid as determined at 118. If additional levels are to be processed, the level counter K is decremented at 120 and processing returns to 114. If images from all levels have been processed, a final set of ROIs, generally as a ranked set, is output at 122 for deliver to an autofocus procedure. The ROIs of the final set can include some, none, or all of the candidate ROIs identified at 108. As noted above, if a suitable set of ROIs cannot be found based on identified candidate images, it may be necessary to manually select an ROI for use in autofocus.

Example 2. ROI Evaluation Using Eigenvalues

Figure 2:
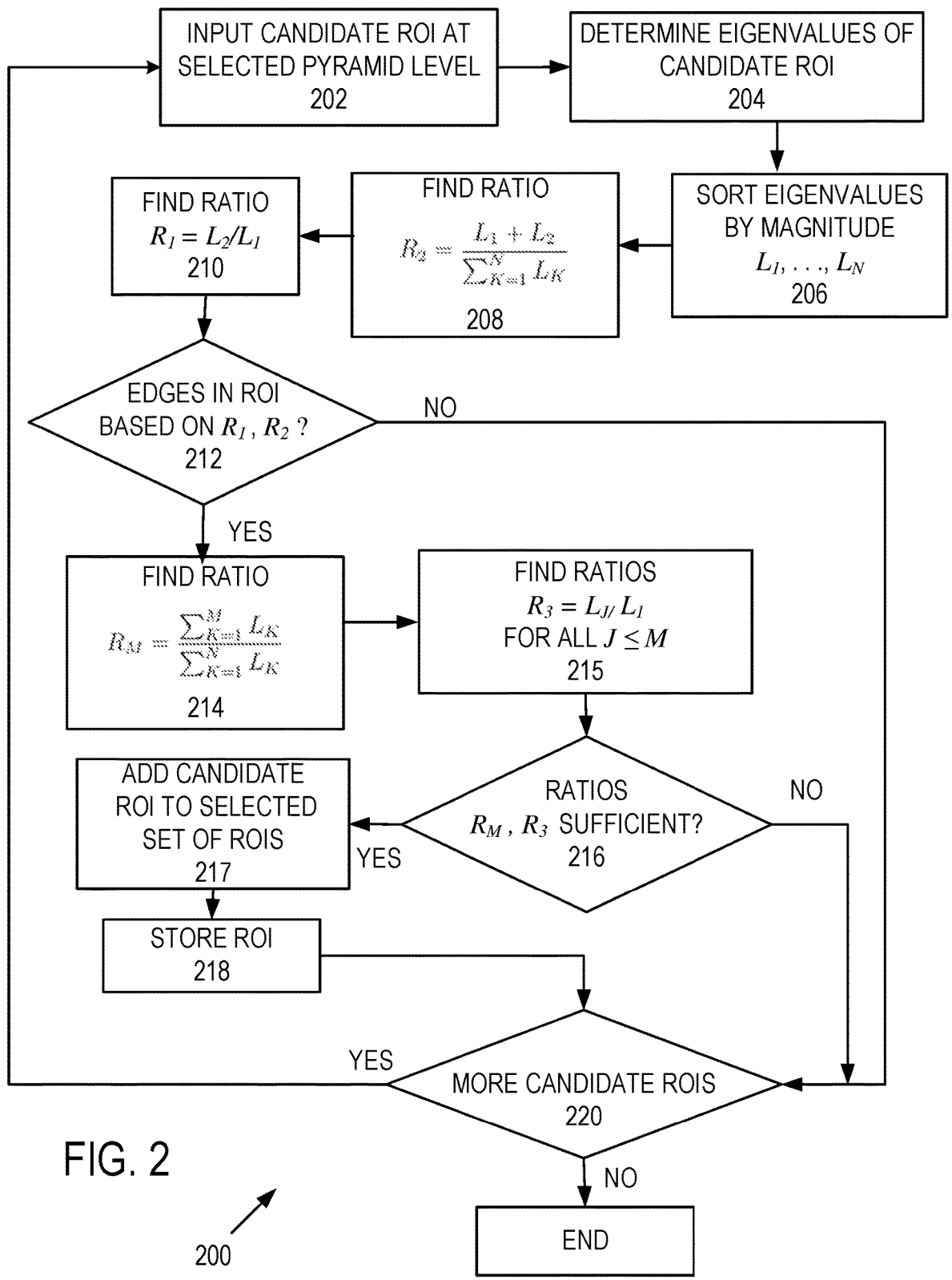
FIG. 2 illustrates a representative method of ranking ROIs for use in automatic focus and astigmatism adjustment.

FIG. 2 illustrates a method 200 of processing of an image in a selected level of Gaussian pyramid to select and rank ROIs in the selected level. At 202, a candidate ROI associated with the selected level is input. The candidate ROI can be represented as a square matrix of intensity values. At 204, eigenvalues of the candidate ROI are determined and at 206, eigenvalues are sorted based on magnitude $L_K$, from largest to smallest. At 208, a ratio R of an eigenvalue having the second largest magnitude $L_2$ to the eigenvalue having the largest magnitude $L_1$ is obtained, i.e., $R_1=L_2/L_1$. At 210, a ratio $R_2$ of a sum of the magnitudes of the two largest magnitude eigenvalues to the sum of magnitudes of all eigenvalues is obtained, i.e., $$R_2 = \frac{L_1 + L_2}{\sum_{K=1}^{N} L_K}.$$

If the ratios $R_1$ and $R_2$ are sufficiently large, such as greater than 0.2, 0.3, 0.4, 0.5, 0.6, or 0.7, the associated ROI is indicated as having strong edges that are approximately orthogonal and may have a high-contrast corner. If the ratios $R_1$ and $R_2$ are not sufficiently large, as determined at 212, a different candidate region is selected at 220, if additional candidate ROIs are available based on, for example, image gradients. If the ratios $R_1$ and $R_2$ are sufficiently large, at 214, a ratio $R_M$ is obtained as a ratio of a sum of magnitudes of the M largest eigenvalues to the sum of the magnitudes of all eigenvalues:

$$R_M = \frac{\sum_{K=1}^{M} L_K}{\sum_{J=1}^{N} L_K}.$$

In addition, at 215, a ratio $R_3=L_{J1}/L_1$ is determined as a measure of similarity of the N largest eigenvalues. At 216, it is determined if the N largest eigenvalues are sufficiently similar, e.g., if the ratio $R_3=L_J/L_1$ is greater than 0.2, 0.3, 0.4, 0.5, 0.6, 0.7, 0.8, or 0.9 for all 2<J<36 of the largest eigenvalues. It is also determined if a set of largest magnitude eigenvalues account for a substantial portion of the variability in the image as indicated by, for example, that the ratio $R_M$ that is sufficiently large, such as greater than 0.2, 0.3, 0.4, 0.5, 0.6, 0.7, 0.8, or 0.9 for 2<M<36. If these conditions are met, the associated ROI is indicated as having strong edges oriented in multiple directions with corners or circular shapes in the corresponding gradient magnitude image. Candidate ROIs whose eigenvalues satisfy the above conditions at 216 are added to a selected set of ROIs to be used in autofocus procedures at 217 and stored at 218. Candidate regions that have suitable values of one or more of the ratios $R_1$, $R_2$, $R_3$, or $R_M$ can also be selected, even if other ratios are not within a preferred range. At 220, another candidate ROI can be selected, and processing repeats until all or sufficient ROIs in the selected level are processed. The method 200 is typically executed for each level of the Gaussian pyramid, starting with the lowest resolution image (the highest level in the pyramid). In some cases, ROIs are processed at only one or a few levels, and only some candidate ROIs are evaluated. This procedure is applied to each level of an image pyramid, and candidates ROIs output from a $K^{th}$ level serve as inputs to a $(K-1)^{th}$ level. Images of some or all levels can be used, and only selected candidate ROIs are evaluated, and not all.

As discussed above, various ranges for the ratios $R_1$, $R_2$, $R_3$, and $R_M$ can be used but typical values of 0.5, 0.7, and 0.9 are used. In general, selected ROIs can be ranked based on some or all of these ratios so that each ROI can be associated with values $R_1$, $R_2$, $R_3$, and $R_M$. The ROI rankings can be stored along with a pointer to the associated ROI image block such as a row and column associated with a pixel having a largest gradient magnitude.

Determining eigenvalues corresponds to principal component analysis (PCA) which can model variations in the ROI and identify significant variations. With PCA, ROIs that have sharply defined features in multiple directions can be found using their relatively large eigenvalues as discussed above.

In this example, particular ratios are used to assess ROIs for suitability for autofocus. In other examples, averages of some or all eigenvalue magnitudes and other eigenvalues can be used in assessing ROI suitability for autofocus.

Example 3. Dual Beam System

Figure 3:
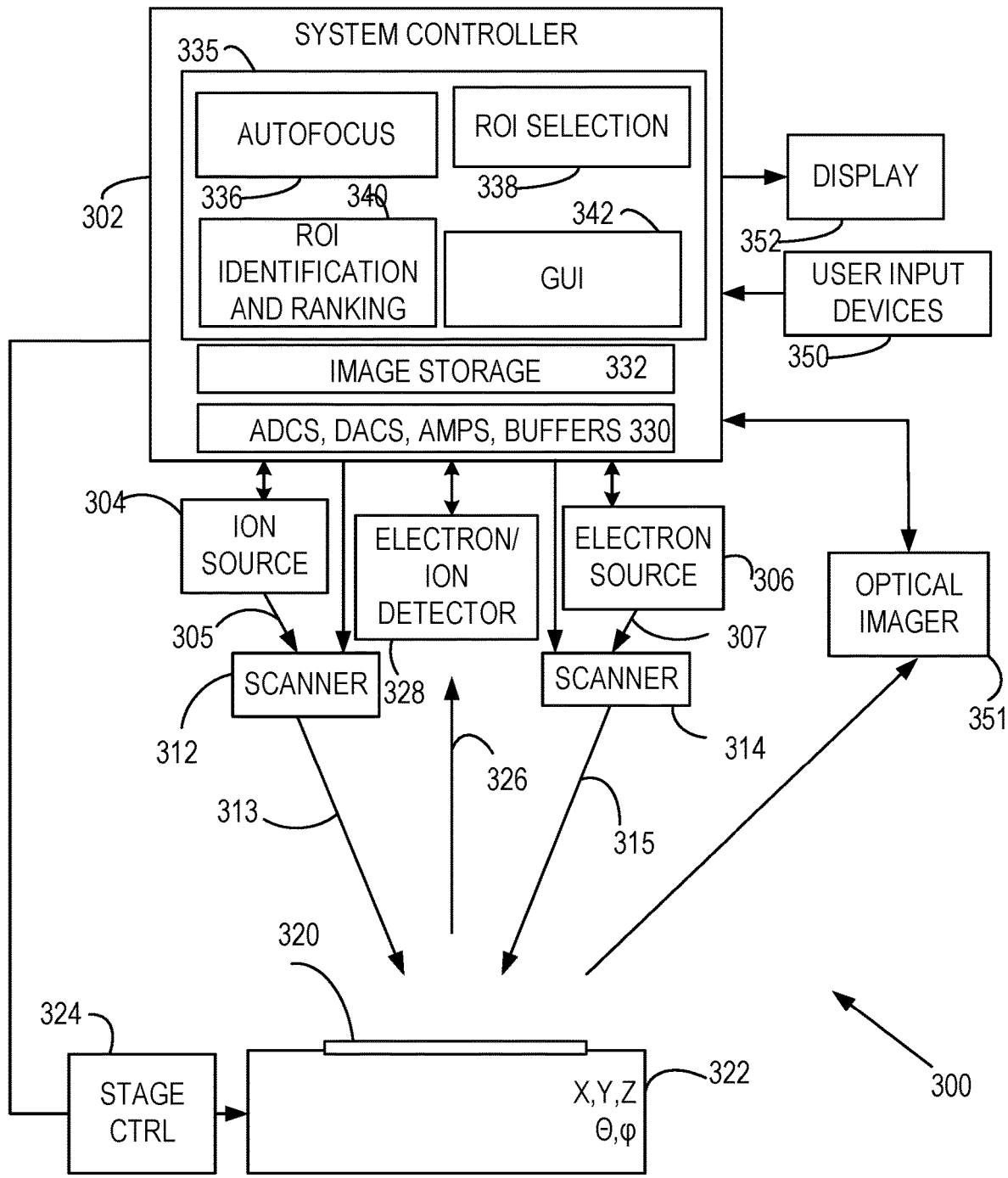
FIG. 3 illustrates a representative dual beam system that includes automatic focus and astigmatism adjustment based on selected ROIs.

Referring to FIG. 3, a dual beam system 300 includes a system controller 302 that is coupled to an ion beam source 304 and an electron beam source 306 that produce an ion beam 305 and an electron beam 307, respectively. Respective scanners 312, 314 are situated to direct a scanned ion beam 313 and a scanned electron beam 315, respectively, with respect to a specimen 320. In some applications, images are obtained based on the scanned electron beam 315, and the scanned ion beam 313 is used for specimen modification. However, images can be obtained with either one or both of the scanned ion beam 313 and the scanned electron beam 315. In some cases, an imaging system includes only one of an electron beam source and an ion beam source. For many biological specimens, only an electron beam is required, and ion beam components are not used.

The specimen 320 is secured to a stage 322 that is coupled to a stage controller 324 that is in turn coupled to the system controller 302. The stage 322 generally can provide one or more translations, rotations, or tilts as directed by the system controller 302. A beam 326 responsive to the scanned ion beam 313 or the scanned electron beam 315 is directed to an electron or ion detector 328 which is coupled to system electronics 330 which can include one or more analog-to-digital convertors (ADCs), digital to analog-convertors (DACs), amplifiers, and buffers for control of the detector 328 and processing (amplification, digitization, buffering) of signals associated with the detector 328. In other examples, a photon detector is used that produces an electrical signal that is further processed by the system electronics. In most practical examples, at least one ADC is used to produce a digitized detector signal that can be stored in one or more tangible computer readable media (shown as image storage 332) as an image. In other examples, image storage is remote via a communication connection such as a wired or wireless network connection. The beam 326 can be scattered portions of the scanned ion beam 313, the scanned electron beam 315, secondary electrons, ions, or neutral atoms. An optical imager 351 such as a camera is coupled to produce an image of the specimen 320 to, for example, provide visual feedback to a technician.

The system controller 302 is coupled to a memory 335 that stores processor-executable instructions for image processing and acquisition such as autofocus 336, ROI identification and ranking 340 including gradient and eigenvalue calculations and rankings, selection of ROIs and updating of usages in responses to autofocus requests 338, and to provide a graphical user interface (GUI) 342 for various functions, including parameters associated with selection of ROIs for autofocus and whether usage indicators are to be provided to avoid possible beam damage and/or sample charging. Images (both CPB and optical) can be stored in a memory portion 332. Stage coordinates (including rotations) can be stored in the memory portion 332 as well. The system controller 302 establishes image acquisition parameters and is in communication with the stage controller 324. Specimen images can be presented on a display 352, and system control and imaging parameters can be specified using internally stored values from the memory 335 or provided by a user with one or more user input devices 350.

It will be appreciated that the layout of FIG. 3 is for convenient illustration, and actual alignments of various beam sources, the optical imager 351, and the CPB detector(s) are not shown. While a dual beam (ion/electron) system is illustrated, one or both can be used, and in many practical examples such as electron microscopy, only an electron beam is used for imaging.

Example 4. Representative Computing Environment

Figure 4:
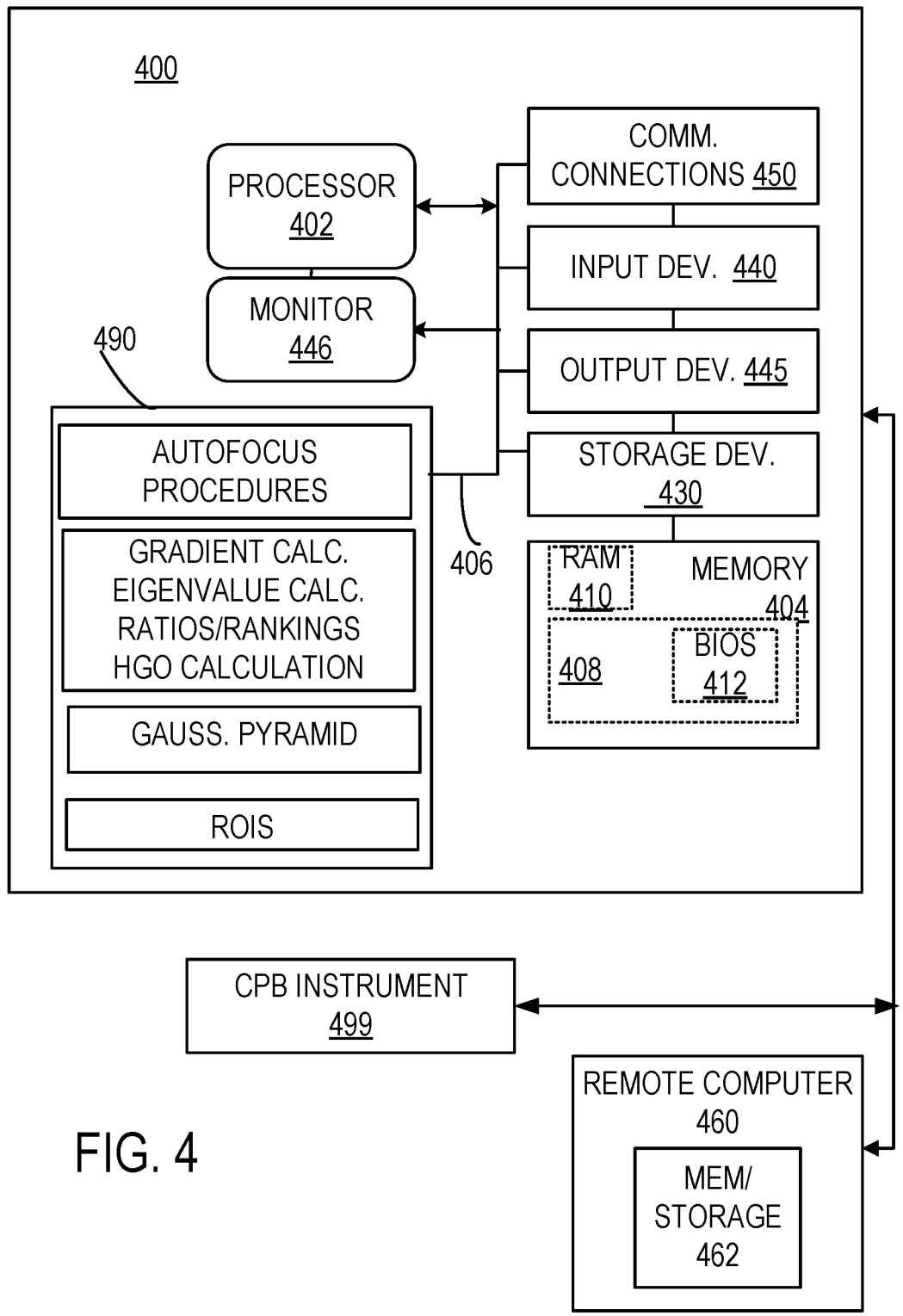
FIG. 4 illustrates a representative computing environment for implementing the disclosed methods and apparatus.

FIG. 4 and the following discussion are intended to provide a brief, general description of an exemplary computing environment in which the disclosed technology may be implemented. In particular, some or all portions of this computing environment can be used with the above methods and apparatus to, for example, identify and rank ROIs for use in autofocus operations. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including handheld devices, tablets, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices. As used herein, processor refers to CPUs and other logical processing devices such as FPGAs, ASICs, and CPLDs.

With reference to FIG. 4, an exemplary system for implementing the disclosed technology with a CPB instrument 499 includes a general-purpose computing device in the form of an exemplary conventional PC 400, including one or more processing units 402, a system memory 404, and a system bus 406 that couples various system components including the system memory 404 to the one or more processing units 402. The system bus 406 may be any of several types of bus structures including a memory bus or memory controller, a peripheral bus, and a local bus using any of a variety of bus architectures. The exemplary system memory 404 includes read only memory (ROM) 408 and random-access memory (RAM) 410. A basic input/output system (BIOS) 412, containing the basic routines that help with the transfer of information between elements within the PC 400, is stored in ROM 408.

The exemplary PC 400 further includes one or more storage devices 430 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 406 by a hard disk drive interface, a magnetic disk drive interface, and an optical drive interface, respectively. The drives and their associated computer readable media provide nonvolatile storage of computer-readable instructions, data structures, program modules, and other data for the PC 400. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 430 including an operating system, one or more application programs, other program modules, and program data. A user may enter commands and information into the PC 400 through one or more input devices 440 such as a keyboard and a pointing device such as a mouse. For example, the user may enter commands to initiate ROI selection or to initiate autofocus, or to select automatic ROI selection and autofocus. Other input devices may include a digital camera, microphone, joystick, game pad, satellite dish, scanner, or the like. These and other input devices are often connected to the one or more processing units 402 through a serial port interface that is coupled to the system bus 406 but may be connected by other interfaces such as a parallel port, game port, universal serial bus (USB), or wired or wireless network connection. A monitor 446 or other type of display device is also connected to the system bus 406 via an interface, such as a video adapter, and can display, for example, one or ROI images, gradient images, or other processed images. The monitor 446 can also be used to aid in CPB instrument control, to confirm successful focus and astigmatism control, and other functions. Other peripheral output devices, such as speakers and printers 450 may be included.

The PC 400 may operate in a networked environment using logical connections to one or more remote computers, such as a remote computer 460. In some examples, one or more network or communication connections 450 are included. The remote computer 460 may be another PC, a server, a router, a network PC, or a peer device or other common network node, and typically includes many or all of the elements described above relative to the PC 400, although only a memory storage device 462 has been illustrated in FIG. 4. The personal computer 400 and/or the remote computer 460 can be connected to a logical a local area network (LAN) and a wide area network (WAN).

As shown in FIG. 4, a memory 490 (or portions of this or other memory) stores processor executable instructions for autofocus, ROI identification, selection, and ranking for use in autofocus including instructions for gradient and eigenvalues calculations, determination of ratios discussed above, producing a Gaussian pyramid, and histogram of gradient orientations (HGO) calculations and evaluation. In addition, the memory 490 can store ROIs and/or locations and block sizes along with rankings so that an autofocus procedure can select an ROI and, if desired, indicate how many times a selected ROI has been used.

Example 5. Autofocus with Selected ROIs

Figure 5:
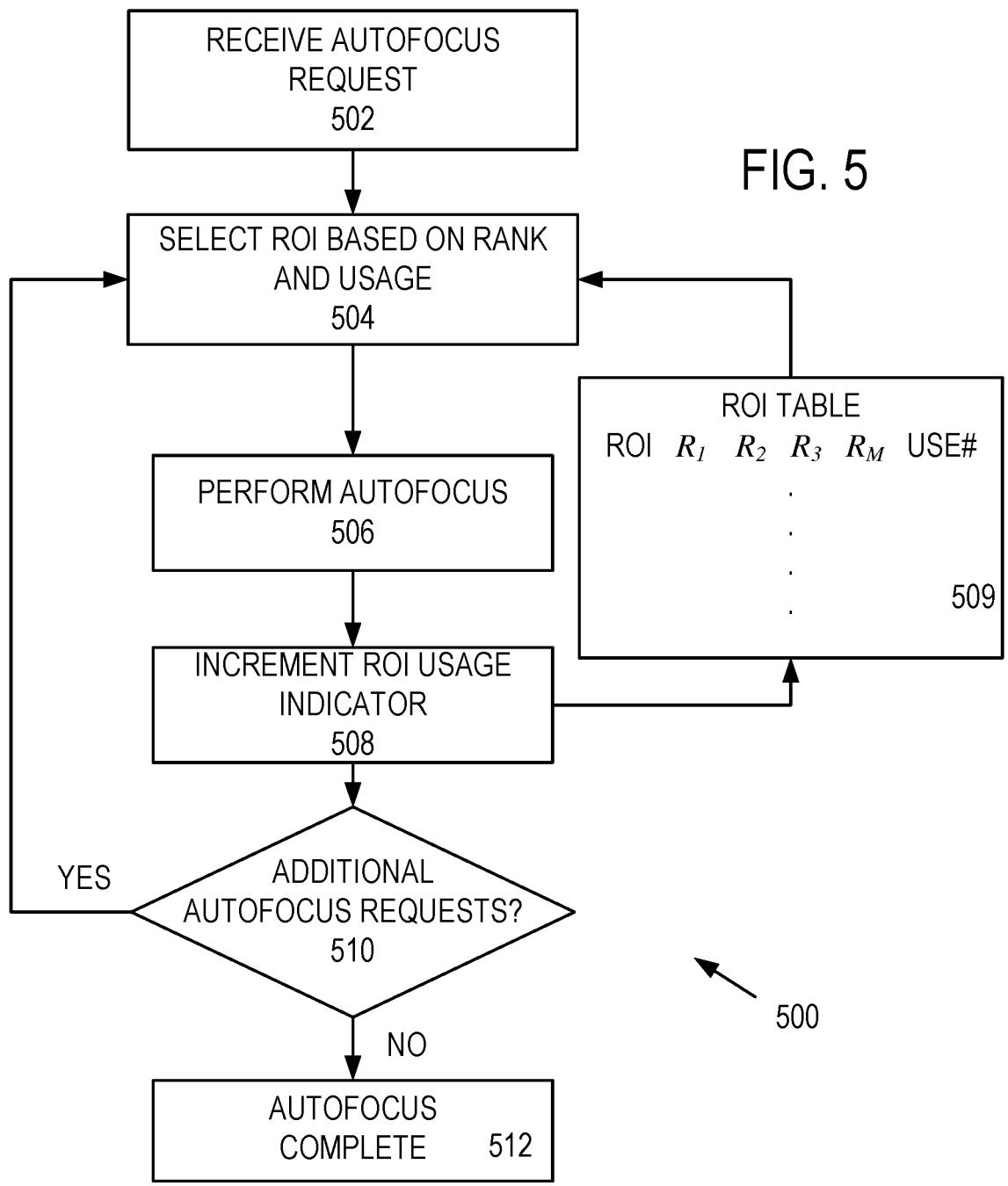
FIG. 5 illustrates a representative autofocus method using ranked ROIs.

Referring to FIG. 5, a representative method 500 includes receiving an autofocus request in a CPB imaging system at 502. A ROI is selected for use in autofocus at 504, from a set of ROIs stored in a memory 509, based on ROI rank or ranks such as one or more or a combination of the ratios $R_1$, $R_2$, $R_3$, and $R_M$ discussed above and/or a number of previous uses of a particular ROI (use #). The ROIs can be stored as a location and block size of the ROI from a common image instead of as image data. In addition, a usage indicator can be provided for each ROI so that a number of uses of each ROI can be limited to avoid damage or charging of the ROI. At 506, autofocus is performed using the selected ROI and a usage indication associated with the selected ROI is updated at 508. At 510, requests for subsequent autofocus are awaited in response to instrument drift, elapsed time, a change in a specimen requiring a set of ROIs based on the new specimen, or user request. Upon receiving an autofocus request, a ROI is selected again at 504 and the method 500 continues as discussed above. If an additional autofocus request is not received, autofocus terminates at 512. With the method 500, autofocus does not require operator intervention; even if autofocus is operator-initiated, autofocus using the ROIs requires no additional attention after the request. As a result, autofocus can be instituted at any time that does not interfere with use.

Example 6. ROIs Using a Histogram of Gradient Orientations (HGO)

Figure 7:
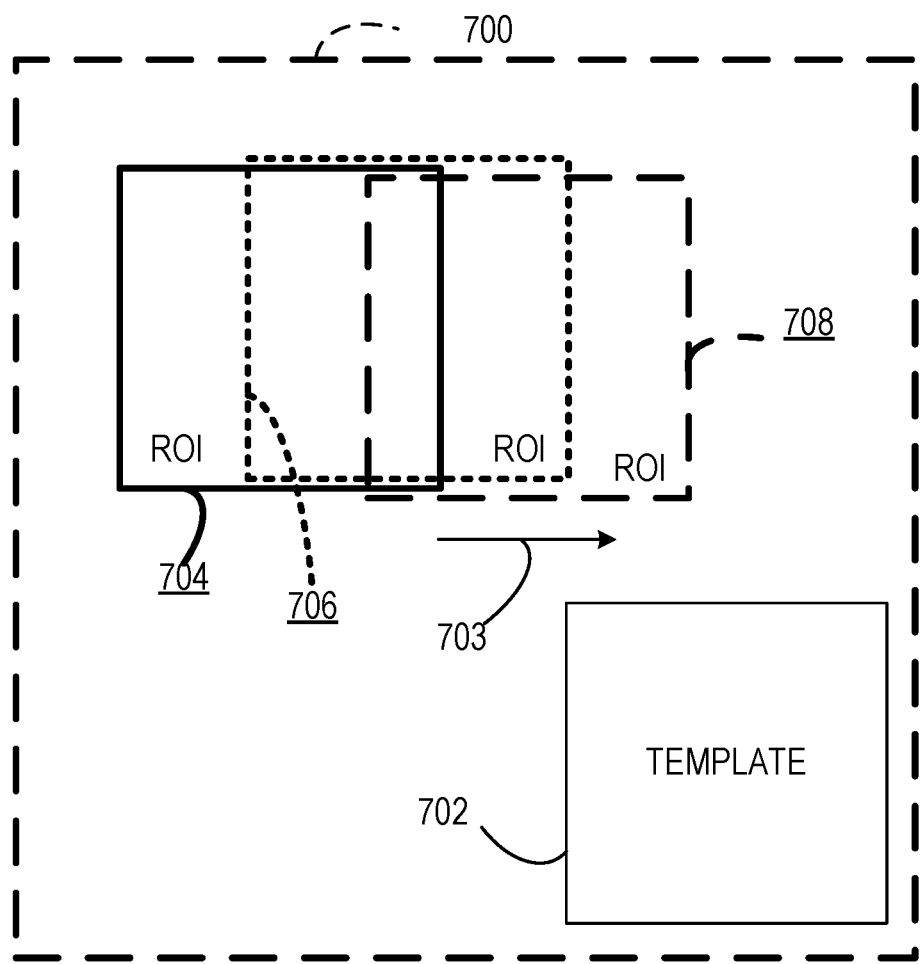
FIG. 7 illustrates a representative method of defining ROIs in an image.

HGOs can also be used to evaluate candidate ROIs for use in focus and astigmatism correction. Generally, preferred ROIs have gradients of suitable magnitude in multiple directions such as a uniform distribution of gradients. As discussed above, in an initial step, ROIs can be evaluated to determine gradient magnitudes such as by comparison to a threshold value, and ROIs without sufficient gradient magnitudes need not be further processed as such ROIs are generally less suitable for focus and astigmatism adjustment. As shown in FIG. 7, candidate ROIs are obtained by selecting an image 700 and scanning a selected image area template 702 across the image 700 to produce ROIs 704, 706, 708. In this example the selected image area template is scanned rightward in a direction indicated at 703 from ROI 704 to define ROIs 706, 708. Scanning can be vertical or horizontal, and a scanning step size is generally between $\frac{1}{32}$ and $\frac{1}{4}$ of a number of pixels in a row or column of a ROI. For example, for a ROI that is 256 by 256 pixels, step sizes of 2, 4, 8, 16, 32, or 64 pixels can be used. The ROIs 704, 706, 708 are shown as slightly vertically offset in FIG. 7 so that overlap in FIG. 7 does not obscure their depiction. In practice, no such offset is used. However, an image area template can be scanned in any direction using an arbitrary regular, irregular, periodic, random, or other step size.

Figure 7A:
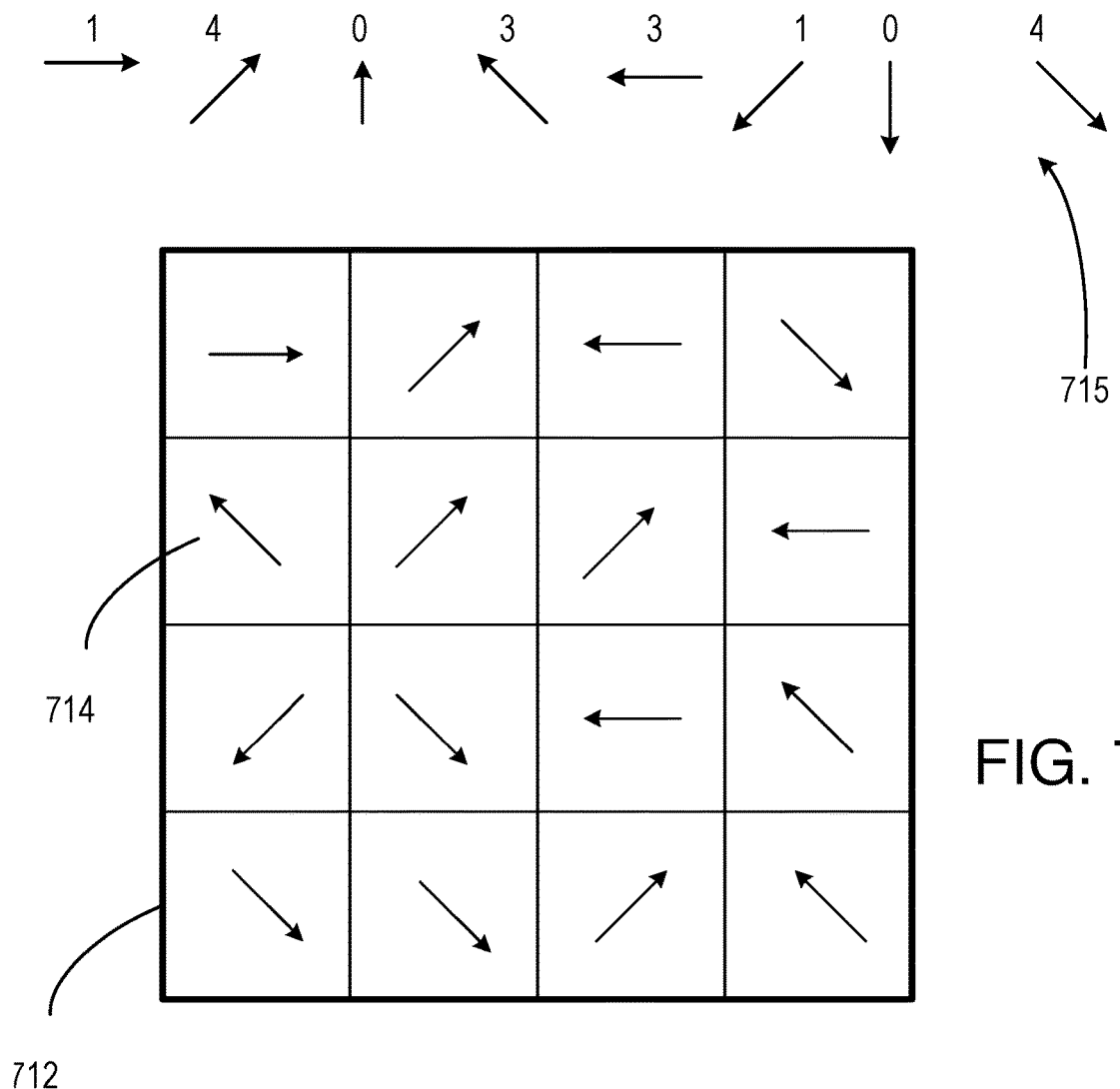
FIGS. 7A-7C illustrate assignments of gradient directions for use in producing histograms of gradient orientations (HGOs).
Figure 7D:
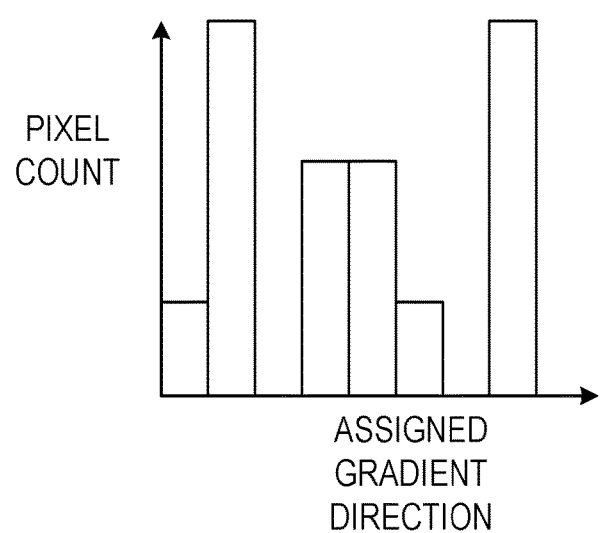
FIG. 7D illustrates an HGO associated with the ROI of FIG. 7A.

FIG. 7A illustrates a ROI 712 that includes 4 rows and 4 columns of pixels such as representative pixel 714. Generally, larger numbers of pixels are used in the ROIs, but the example of FIG. 7A permits convenient explanation. Each pixel of the ROI 712 is assigned a gradient direction from a set of gradient directions 715, shown by arrows. In this example, the gradients are based on nearest-neighbor gradients and there are 8 possible gradient directions. Numbers of pixels associated with each of the directions (shown as arrows) are provided above the ROI 712. The associated HGO is illustrated in FIG. 7D.

Figure 7B:
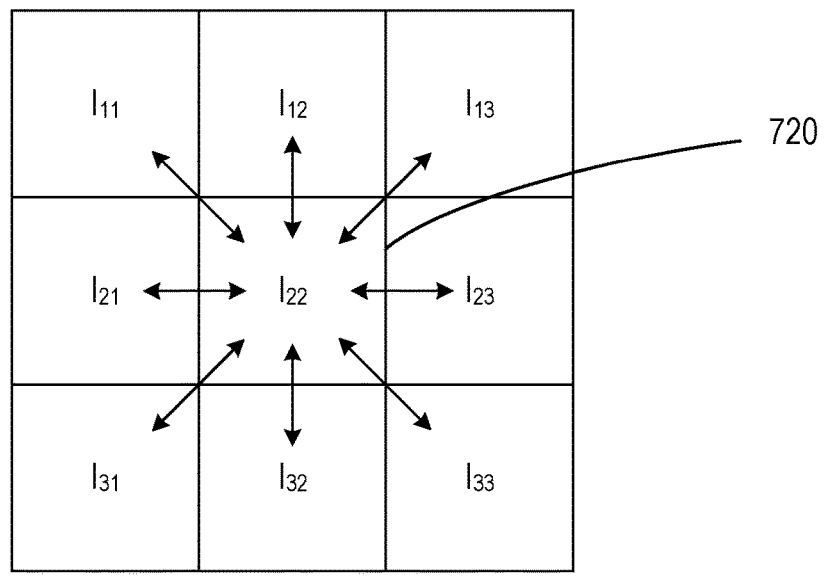
Figure 7C:
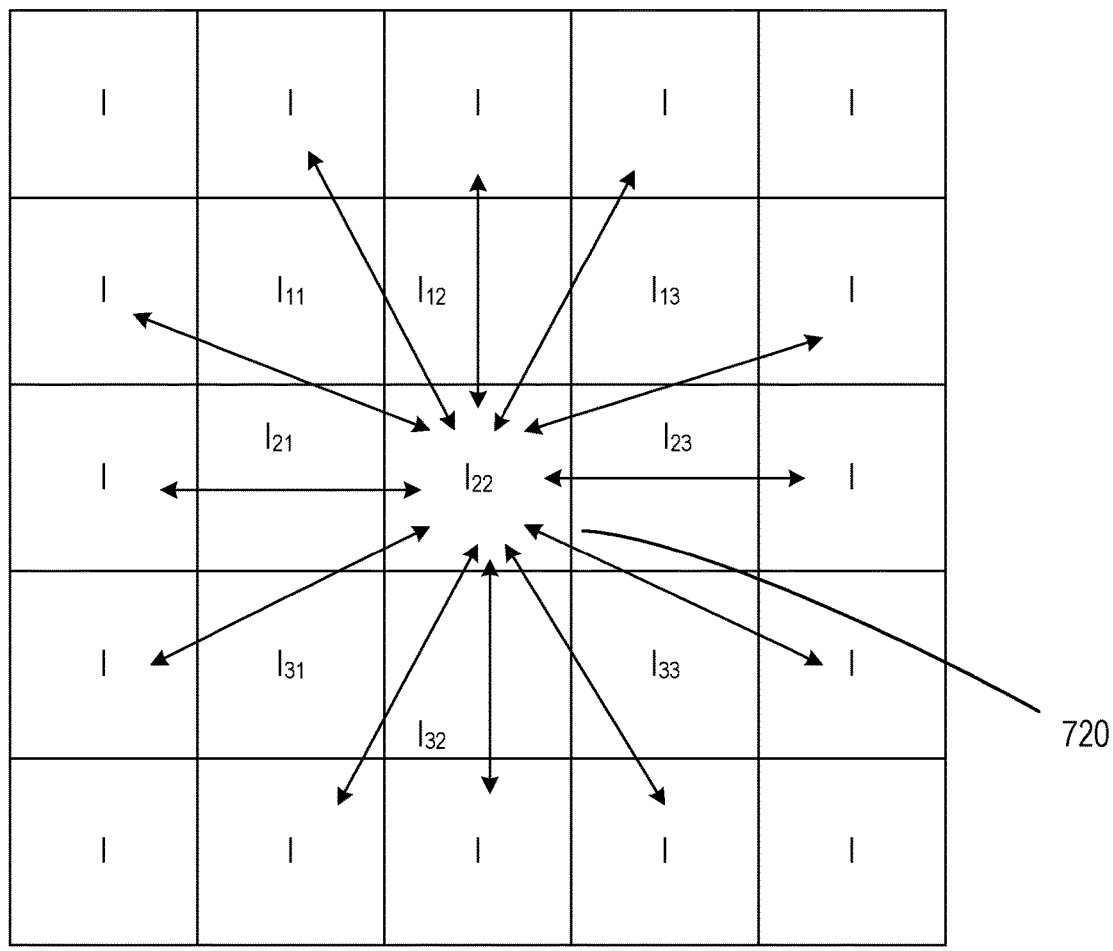

FIG. 7B illustrates a central pixel 720 having an intensity $I_{22}$ and 8 nearest neighbor pixels (intensities $I_{11}$–$I_{13}$, $I_{21}$, $I_{23}$, and $I_{31}$–$I_{33}$). The eight gradient directions based on differences associated with each of these nearest neighbor pixels are shown as arrows. These assignments are used to form an HGO, although in typical examples, pixels with gradient having small magnitudes are not use in forming a histogram. Additional or alternative directions can be used as shown in FIG. 7C in which twelve directions associated with next-nearest neighbor pixels to the central pixel 720 are shown as corresponding arrows. HGOs can be based on one of both of these sets of gradient directions, or gradient directions based on additional pixels.

Figure 7E:
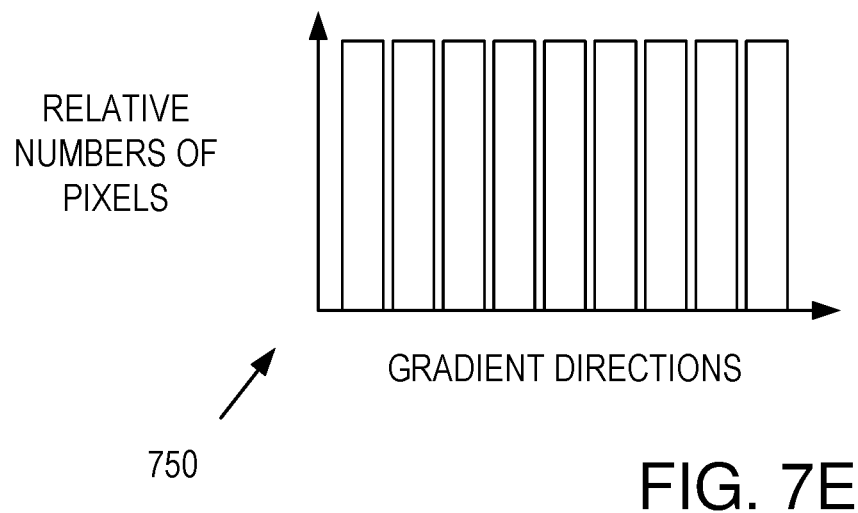
FIG. 7E illustrates an HGO associated with an ROI suitable for use in autofocus.
Figure 7F:
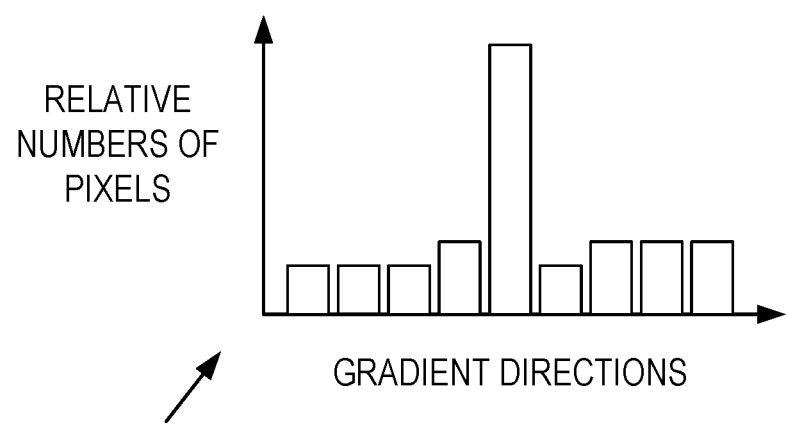
FIG. 7F illustrates an HGO associated with an ROI that is unsuitable for use in autofocus.

FIG. 7E illustrates a target HGO 750 for a ROI in which numbers of pixels associated with each of the gradient directions are substantially the same, indicative of a suitable candidate ROI. FIG. 7F illustrates an HGO 752 in which a distribution of gradients is concentrated along a single gradient direction and is associated with a candidate ROI that is less suitable for autofocus.

Example 7. Representative HGO Method

Figure 8:
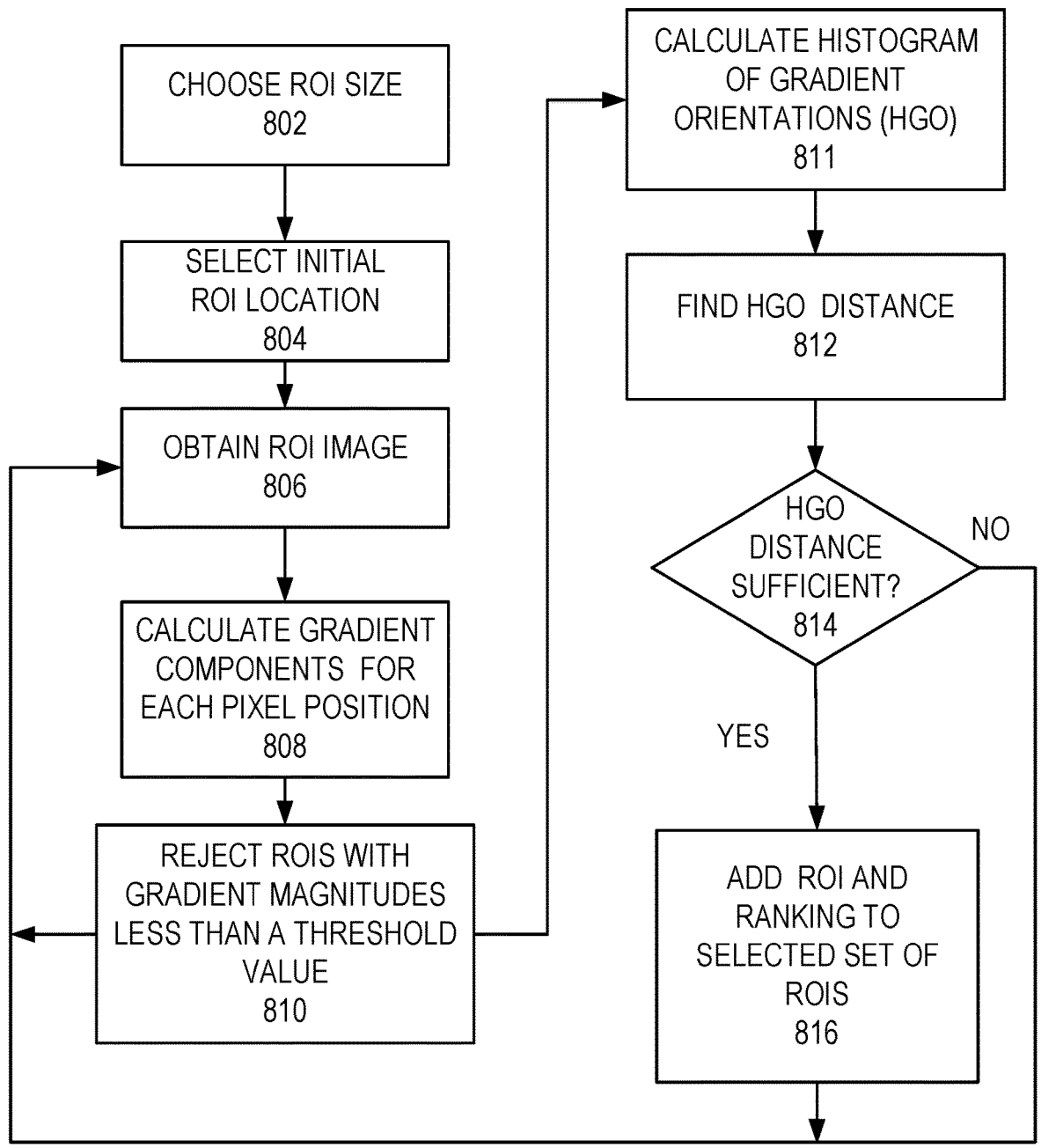
FIG. 8 illustrates a representative method of selecting and ranking candidate ROIs using HGOs.

Referring to FIG. 8, a representative method 800 includes selecting an ROI size at 802 and an initial ROI location at 804. At 806, an IROI image is obtained and at 808, gradient components for each pixel in the ROI are calculated. At 810 the ROI is evaluated, and ROIs associated with gradient magnitudes less than a threshold value are rejected for use in autofocus and astigmatism control and a different ROI is selected for evaluation at 806. Otherwise, an associated HGO is calculated at 811 and compared with a uniform or other preferred reference HGO at 812. If a distance of the HGO for the selected ROI from the reference HGO is sufficient as determined at 814, the ROI is added to a set of ROIs for focus and astigmatism control at 816 and then an ROI is again selected at 806. If the HGO distance is not sufficient at 814, a ROI is again selected at 806. With a reference HGO that is unform, i.e., all gradient directions appear with similar frequencies, ROIs associated with smaller distances are suitable; with a reference HGO that is associated with one or a few gradient directions, larger distances are preferred. In FIG. 8 (and other examples), multiple candidate ROIs are evaluated and multiple of the candidate ROIs are selected, but in some cases only a single suitable ROI is used, and multiple candidate ROIs need not be evaluated.

Example 8. HGO Comparisons

HGOs can be evaluated using various approaches. In one example, an HGO can be displayed for evaluation by a technician. In this case, it may be helpful to display HGOs associated with suitable candidate ROIs and/or unsuitable candidate ROIs as reference HGOs to assist in visual comparisons. For example, an HGO for a candidate ROI can be displayed with acceptable HGOs and/or unacceptable HGOs such as those illustrated in FIGS. 7D-7E. A technician can then determine if a candidate ROI is acceptable based on, for example, one or more of differences in shape, distribution, and peaks of the HGO associated with the candidate ROI. Visual comparison can also be made based on a display of a candidate HGO and a reference HGO overlaid on each other.

While visual methods of comparing HGOs can be used, approaches that do not require technician input are generally preferred. In one example, statistics for a candidate HGO are computed such as, standard deviation and/or or skewness. Relatively large values of standard deviations and higher values of skewness are indicative of preferred candidate ROIs. Candidate ROIs can also be evaluated based on a Kolmogorov-Smirnov test used to determine a difference between an HGO associated with a candidate ROI to a reference HGO. A chi-square test can also be used to compare frequencies in different histogram bins to compare HGOs. The so-called Earth Mover's Distance (EMD) (also referred to as a Wasserstein metric) can be used. In another example, Kullback-Leibler Divergence (KLD) can be used to assess differences between HGOs. Depending on whether a preferred (acceptable) HGO or an unpreferred (unacceptable) HGO is used as a reference in a comparison, higher or lower values of test values are used to select candidate ROIs and the associated test values can be used to rank a selected ROI.

Example 8. Representative HGO Comparison Methods

Referring to FIG. 9, a representative method 900 includes selecting a candidate ROI for evaluation at 902. At 904, an HGO associated with the selected candidate ROI is obtained and at 906, a comparison method is selected. Comparison with an unpreferred reference HGO is performed at 908 and at 910, based on the comparison, the selected ROI is identified as suitable and added to a set of final ROIs with or without a ranking or identified as unsuitable and not added to the set of final ROIs. Alternatively, comparison with a preferred reference HGO is selected at 906 and the comparison performed at 912. Based on the comparison, the selected ROI is identified as suitable and added to a set of final ROIs with or without a ranking or identified as unsuitable and not added to the set of final ROIs at 910. As shown, comparison of HGOs with two or more reference HGOs can be used, with one or more preferred reference HGOs and/or one or more unpreferred reference HGOs in order to determine ROI candidate suitability. At 914, another candidate ROI can be selected and evaluated as described above. If no further ROIs are to be evaluated, the method ends at 916.

Disclosure Clauses

Clause 1 is a method, including: obtaining a sample image; processing the sample image to obtain gradient magnitudes; and selecting a set of initial candidate regions of interest (ROIs) in the sample image associated with gradient magnitudes greater than a threshold value.

Clause 2 includes the subject matter of Clause 1, and further includes ranking each of the initial candidate ROIs based on the associated gradient magnitudes.

Clause 3 includes the subject matter of any of Clauses 1-2, and further specifies evaluating the initial candidate ROIs based on a histogram of gradient orientations (HGO) associated with each of the initial candidate ROIs.

Clause 4 includes the subject matter of any of Clauses 1-3, and further specifies that the gradient orientations in the HGO are based on gradient orientations determined from nearest neighbor pixels associated with each pixel in the candidate ROIs.

Clause 5 includes the subject matter of any of Clauses 1-4, and further specifies that the evaluating the initial candidate ROIs based on the histogram of gradient orientations (HGO) is performed by comparing the HGO of each ROI to a uniform HGO.

Clause 6 includes the subject matter of any of Clauses 1-5, and further includes: processing the sample image to produce images associated with at least three image resolutions corresponding to an image pyramid; and ranking the initial candidate ROIs based on eigenvalues associated with corresponding image blocks in at least one of the three images of the image pyramid.

Clause 7 includes the subject matter of any of Clauses 1-6, and further includes selecting a first set of candidate ROIs from the initial set of candidate ROIs based on the rankings of the initial set of candidate ROIs obtained with the lowest resolution image of the image pyramid.

Clause 8 includes the subject matter of any of Clauses 1-7, and further includes selecting a second set of candidate ROIs based on rankings of the first set of candidate ROIs set obtained with an image of the image pyramid having a resolution other than the lowest resolution.

Clause 9 includes the subject matter of any of Clauses 1-8, and further includes: processing the sample image to produce a Gaussian image pyramid that includes images associated with at least three image resolutions; and for each image of the Gaussian image pyramid, beginning with the lowest resolution image and ending with the highest resolution image, ranking candidate ROIs from the initial set of candidate ROIs based on eigenvalues associated with corresponding image blocks obtained from the respective image of the Gaussian image pyramid, wherein rankings based on a lower resolution image of the Gaussian image pyramid are used to select candidate ROIs for processing by a next higher resolution image of the Gaussian image pyramid.

Clause 10 includes the subject matter of any of Clauses 1-9, and further specifies that the rankings are based on eigenvalue magnitudes.

Clause 11 includes the subject matter of any of Clauses 1-10, and further specifies that the rankings are based on magnitudes of N eigenvalues having largest magnitudes, wherein N is an integer that is less than 36 and greater than 2.

Clause 12 includes the subject matter of any of Clauses 1-11, and further specifies that the rankings are based on at least one of: a ratio of a sum of magnitudes of N eigenvalues having largest magnitudes to a sum of magnitudes of all eigenvalues, a ratio of a sum of magnitudes of two eigenvalues having the largest magnitudes to the sum of magnitudes of all eigenvalues, a ratio of magnitudes of the eigenvalues having the largest magnitudes, and ratios of each of the N eigenvalues having the largest eigenvalue to an average of the N eigenvalues having the largest eigenvalues.

Clause 13 includes the subject matter of any of Clauses 1-12, and further specifies that the rankings are based the ratio of the sum of the magnitudes of the N eigenvalues having largest magnitudes to the sum of magnitudes of all eigenvalues.

Clause 14 includes the subject matter of any of Clauses 1-13, and further specifies that the images associated with at least three image resolutions have resolutions corresponding to $M/2^K$, wherein M is a size of the sample image and K is an integer greater than zero and less than 10.

Clause 15 includes the subject matter of any of Clauses 1-14, and further includes selecting a final set of candidate ROIs based on eigenvalues associated with image blocks in the highest resolution image, wherein each candidate ROI of the final set of candidate ROIs is selected so that: a ratio of a sum of the magnitudes of the N eigenvalues having largest magnitudes to either a sum of magnitudes of all eigenvalues or a sum of magnitudes of all eigenvalues except the N eigenvalues having the largest magnitudes, wherein the ratio is greater than 0.7; and a ratio of magnitudes of the eigenvalues having two largest magnitudes is between 0.5 and 2.

Clause 16 includes the subject matter of any of Clauses 1-15, and further specifies that a block size for image blocks selected for each image of the Gaussian image pyramid is different.

Clause 17 includes the subject matter of any of Clauses 1-16, and further specifies that the Gaussian image pyramid is obtained with a Gaussian kernel having a standard deviation corresponding to between 3 and 10 image pixels.

Clause 18 includes the subject matter of any of Clauses 1-17, and further includes adjusting a charged-particle-beam (CPB) optical column based on at least one image associated with a ROI in the final set of candidate ROIs.

Clause 19 includes the subject matter of any of Clauses 1-18, and further includes making a series of adjustments of the CPB optical column based on a plurality of different ROIs from the final set of candidate ROIs.

Clause 20 includes the subject matter of any of Clauses 1-19, and further specifies that the plurality of different ROIs is selected beginning with a highest ranking and continuing in a sequence of declining rankings.

Clause 21 is a charged-particle beam (CPB) imaging system, including: a CPB optical column operable to direct a CPB to a sample and produce an image of at least a portion of a sample; a system controller coupled to the CPB optical column and operable to shape and direct the CPB to the sample, wherein the system controller is configured to: process a sample image to obtain a gradient magnitude image; select a set of initial candidate regions of interest (ROIs) in the sample image associated with gradient magnitude image portions having gradient magnitudes greater than a threshold value; ranking each of the initial candidate ROIs; and selecting a ROI from the initial candidate ROIs based on the ranking, and adjusting focus and astigmatism based on the selected ROI.

Clause 22 includes the subject matter of any of Clauses 21-22, and further specifies that the system controller is configured to evaluate candidate ROIs based on images from a set of images defined as an image pyramid.

Clause 23 includes the subject matter of any of Clauses 21-22, and further specifies that the system controller is configured to evaluate candidate ROIs based on eigenvalues associated with the ROIs in the images of the image pyramid.

Clause 24 includes the subject matter of any of Clauses 21-23, and further specifies that the rankings are determined based on ratios of magnitudes of eigenvalues associated with the ROIs in the images of the image pyramid.

Clause 25 includes the subject matter of any of Clauses 21-24, wherein the system controller is configured to evaluate each candidate ROI based on an associated histogram of gradient orientations (HGO).

Clause 26 includes the subject matter of any of Clauses 1-25, and further specifies that the gradient orientations in the HGOs are based on gradient orientations determined from nearest neighbor pixels associated with each pixel in the candidate ROIs.

Clause 27 includes the subject matter of any of Clauses 1-26, and further specifies that the evaluating the initial candidate ROIs based on the histogram of gradient orientations (HGO) is performed by comparing the HGO of each ROI to a uniform HGO.

In view of the many possible embodiments to which the principles of the disclosed technology may be applied, it should be recognized that the illustrated embodiments are only preferred examples. The scope of the invention is defined by the following claims. We therefore claim as our invention all that comes within the scope and spirit of these claims.

We claim:

1. A method, comprising:
    obtaining a sample image;
    processing the sample image to obtain gradient magnitudes; and
    selecting a set of initial candidate regions of interest (ROIs) in the sample image associated with gradient magnitudes greater than a threshold value;
    processing the sample image to produce images associated with at least three image resolutions corresponding to an image pyramid; and
    ranking the initial candidate ROIs based on eigenvalues associated with corresponding image blocks in at least one of the three image resolutions of the image pyramid; and
    selecting a first set of candidate ROIs from the set of initial candidate ROIs based on the rankings of the candidate ROIs of the set of initial candidate ROIs obtained with the lowest resolution image of the image pyramid.

2. The method of claim 1, further comprising ranking each of the initial candidate ROIs based on the associated gradient magnitudes.

3. The method of claim 1, further comprising evaluating the initial candidate ROIs based on a histogram of gradient orientations (HGO) associated with each of the initial candidate ROIs.

4. The method of claim 3, wherein the gradient orientations in the HGO are based on gradient orientations determined from nearest neighbor pixels associated with each pixel in the candidate ROIs.

5. The method of claim 3, wherein the evaluating the initial candidate ROIs based on the histogram of gradient orientations (HGO) is performed by comparing the HGO of each ROI to a uniform HGO.

6. The method of claim 1, further comprising selecting a second set of candidate ROIs based on rankings of the first set of candidate ROIs set obtained with an image of the image pyramid having a resolution other than the lowest resolution.

7. The method of claim 1, wherein the image pyramid is a Gaussian image pyramid that includes images associated with the at least three image resolutions and further comprising:
    for each image of the Gaussian image pyramid, beginning with the lowest resolution image and ending with the highest resolution image, ranking candidate ROIs from the set of initial candidate ROIs based on eigenvalues associated with corresponding image blocks obtained from the respective image of the Gaussian image pyramid, wherein rankings based on a lower resolution image of the Gaussian image pyramid are used to select candidate ROIs for processing by a next higher resolution image of the Gaussian image pyramid.

8. The method of claim 7, wherein the rankings are based on eigenvalue magnitudes.

9. The method of claim 7, wherein the rankings are based on magnitudes of N eigenvalues having largest magnitudes, wherein N is an integer that is less than 36 and greater than 2.

10. The method of claim 9, wherein the images associated with at least three image resolutions have resolutions corresponding to $M/2^K$, wherein M is a size of the sample image and K is an integer greater than zero and less than 10.

11. The method of claim 9, further comprising selecting a final set of candidate ROIs based on eigenvalues associated with image blocks in the highest resolution image, wherein each candidate ROI of the final set of candidate ROIs is selected so that:
- a ratio of a sum of the magnitudes of the N eigenvalues having largest magnitudes to either a sum of magnitudes of all eigenvalues or a sum of magnitudes of all eigenvalues except the N eigenvalues having the largest magnitudes, wherein the ratio is greater than 0.7; and
- a ratio of magnitudes of the eigenvalues having two largest magnitudes is between 0.5 and 2.

12. The method of claim 11, wherein a block size for image blocks selected for each image of the Gaussian image pyramid is different.

13. The method of claim 11, wherein the Gaussian image pyramid is obtained with a Gaussian kernel having a standard deviation corresponding to between 3 and 10 image pixels.

14. The method of claim 11, further comprising adjusting a charged-particle-beam (CPB) optical column based on at least one image associated with a ROI in the final set of candidate ROIs.

15. The method of claim 14, further comprising making a series of adjustments of the CPB optical column based on a plurality of different ROIs from the final set of candidate ROIs.

16. The method of claim 15, wherein the plurality of different ROIs is selected beginning with a highest ranking and continuing in a sequence of declining rankings.

17. The method of claim 7, wherein the rankings are based on at least one of:
- a ratio of a sum of magnitudes of N eigenvalues having largest magnitudes to a sum of magnitudes of all eigenvalues,
- a ratio of a sum of magnitudes of two eigenvalues having the largest magnitudes to the sum of magnitudes of all eigenvalues,
- a ratio of magnitudes of the eigenvalues having the largest magnitudes, and
- ratios of each of the N eigenvalues having the largest eigenvalue to an average of the N eigenvalues having the largest eigenvalues.

18. The method of claim 17, wherein the rankings are based the ratio of the sum of the magnitudes of the N eigenvalues having largest magnitudes to the sum of magnitudes of all eigenvalues.

19. A charged-particle beam (CPB) imaging system, comprising:
- a CPB optical column operable to direct a CPB to a sample and produce an image of at least a portion of a sample; and
- a system controller coupled to the CPB optical column and operable to shape and direct the CPB to the sample, wherein the system controller is configured to:
  - process a sample image to obtain a gradient magnitude image;
  - select a set of initial candidate regions of interest (ROIs) in the sample image associated with gradient magnitude image portions having gradient magnitudes greater than a threshold value;
  - process the sample image to produce images associated with at least three image resolutions corresponding to an image pyramid;
  - rank the initial candidate ROIs based on eigenvalues associated with corresponding image blocks in at least one of the three image resolutions of the image pyramid;
  - select a first set of candidate ROIs from the set of initial candidate ROIs based on the rankings of the candidate ROIs of the set of initial candidate ROIs obtained with the lowest resolution image of the image pyramid; and
  - select a ROI from the first set of candidate ROIs based on the ranking, and adjusting focus and astigmatism based on the selected ROI.

20. The CPB imaging system of claim 19, wherein the system controller is configured to evaluate candidate ROIs based on eigenvalues associated with the candidate ROIs in the images of the image pyramid.

21. The CPB imaging system of claim 19, wherein the rankings are determined based on ratios of magnitudes of eigenvalues associated with the candidate ROIs in the images of the image pyramid.

22. The CPB imaging system of claim 19, wherein the system controller is configured to evaluate each candidate ROI based on an associated histogram of gradient orientations (HGO).

23. The CPB imaging system of claim 22, wherein the gradient orientations in the HGOs are based on gradient orientations determined from nearest neighbor pixels associated with each pixel in the candidate ROIs.

24. The CPB imaging system of claim 22, wherein the evaluating the initial candidate ROIs based on the histogram of gradient orientations (HGO) is performed by comparing the HGO of each ROI to a uniform HGO.

* * * * *